United States Patent [19]

Salyer et al.

[11] 3,954,662

[45] May 4, 1976

[54] AQUEOUS FOAM COMPOSITIONS TO SUPPRESS COAL DUST

[75] Inventors: Ival O. Salyer; James L. Schwendeman, both of Dayton; Shih-ming Sun, Kettering, all of Ohio

[73] Assignee: Monsanto Research Corporation, St. Louis, Mo.

[22] Filed: Jan. 2, 1974

[21] Appl. No.: 430,342

Related U.S. Application Data

[63] Continuation of Ser. No. 226,207, Feb. 14, 1972, abandoned.

[52] U.S. Cl. ............................... 252/382; 252/88; 252/307; 427/220
[51] Int. Cl.² ....................... C09K 3/22; E21F 5/02
[58] Field of Search ................... 252/382, 88, 307; 117/137; 427/220

[56] References Cited
UNITED STATES PATENTS

| | | | |
|---|---|---|---|
| 3,308,067 | 3/1967 | Diehl | 252/89 |
| 3,563,795 | 2/1971 | Williams et al. | 117/139.4 |
| 3,657,135 | 4/1972 | Lewer et al. | 252/88 |

*Primary Examiner*—Leland A. Sebastian
*Assistant Examiner*—Irwin Gluck
*Attorney, Agent, or Firm*—Bruce Stevens

[57] ABSTRACT

Aqueous foamable compositions can be used to suppress coal dust, especially respirable coal dust, i.e., coal dust having particle size less than about 10 microns. These compositions are composed principally of water with a minor amount of an interpolymer of:
a. a polymerizable vinyl ester and
b. a partial ester compound interpolymerizable therewith selected from the group consisting of partial esters of ethylenically unsaturated aliphatic dicarboxylic acids and anhydrides containing from 4-8 carbon atoms and mixtures thereof; said dicarboxylic acid or anhydride having up to half of its acidic hydrogen atoms replaced by lower alkyl groups of 1–8 carbon atoms and mixtures thereof to bind the coal dust and give body to the foam, and a minor amount of a detergent wetting agent to promote foaming and the wetting of the coal by water.

These interpolymers bind the coal dust and reduce or prevent reacrosolation after the foam has collapsed. These interpolymers also serve to give body to the foam, i.e., to promote the desired degree of stability of the foam which in most cases should be of limited duration. Especially good interpolymers are those which are soluble in water at room temperature (25°C.) in the amount required in the composition, e.g. vinyl acetate/maleic anhydride copolymer esters. Nonionic detergents, which are water soluble at room temperature in the amounts needed in the compositions, are suitable wetting agents for promoting foaming and wetting the coal dust. The foams should be of limited duration so as not to interfere with mining operations.

13 Claims, No Drawings

AQUEOUS FOAM COMPOSITIONS TO SUPPRESS COAL DUST

This is a continuation of application Ser. No. 226,207 filed Feb. 14, 1972, now abandoned.

BACKGROUND OF THE INVENTION

1. Field of the Invention

The invention relates to aqueous compositions useful to make foams of limited duration and to the use of the foams to suppress coal dust.

2. Description of the Prior Art

A number of methods have been used in the past to suppress the respirable coal mine dust and so reduce the incidence of "Pneumoconiosis", more generally known as the "Black Lung" disease. A further benefit of coal dust suppression is reducing the danger of a dust explosion. The most popular current practices are (1) ventilation, (2) water spray, (3) water infusion, (4) water/wetting agent spray, (5) modified coalcutting machine design, and (6) aqueous foam application. Currently, the general practice in coal mines is a combination of ventilation and water spray. Aqueous foam application was initially studied in British coal mines. Preliminary results from a study on foam in the United States coal mines did indicate the effectiveness of this type foam in suppressing coal dust, but these developments have not yet reached the practical stage. (Kobrick, "Water as a Control Method, State-of-the-Art, Sprays and Wetting Agents," Bureau of Mines Information Circular 8458, Proceedings of the Symposium on Respirable Coal Mine Dust, Washington, D.C., November 3–4, 1969, 1970, pages 123–132). In this prior work, water plus a detergent wetting agent was used with air to foam the compositions, and as the article indicates there were certain unsolved problems to make the development practical.

SUMMARY OF THE INVENTION

Aqueous foamable compositions can be used to suppress coal dust, especially respirable coal dust, i.e., coal dust having particle size less than about 10 microns. These compositions are composed principally of water with a minor amount of an interpolymer of: (a) a polymerizable vinyl ester and (b) a partial ester compound interpolymerizable therewith selected from the group consisting of partial esters of ethylenically unsaturated aliphatic dicarboxylic acids and anhydrides containing from 4–8 carbon atoms and mixtures thereof; said dicarboxylic acid or anhydride having up to half of its acidic hydrogen atoms replaced by lower alkyl groups of 1–8 carbon atoms and mixtures thereof to bind the coal dust and give body to the foam, and a minor amount of detergent wetting agent to promote foaming and the wetting of the coal by water. These interpolymers bind the coal dust and reduce or prevent reacrosolation after the foam has collapsed. These interpolymers also serve to give body to the foam, i.e., to promote the desired degree of stability of the foam which in most cases should be of limited duration. Especially good interpolymers are those which are soluble in water at room temperature (25°C.) in the amount required in the composition, e.g. vinyl acetate/maleic anhydride copolymer esters. Nonionic detergents, which are water soluble at room temperature in the amounts needed in the compositions, are suitable wetting agents for promoting foaming and wetting the coal dust. The foams should be of limited duration so as not to interfere with mining operations.

DETAILED DESCRIPTION

The foamable compositions of the invention are preferably applied as a foam to the coal dust as it is being formed bu the cutter of the coal cutting machine. Applied in this way, over 90% of the respirable coal dust is suppressed. It is preferred to apply the foam to the dust as it is being formed at the cutter because the foam need only be applied to a limited space, the coal dust is fresh and unoxidized, and the dust is less difficult to knockdown before it has become airborne. The effectiveness of foam is enhanced by applying foam onto the cutter prior to its coal cutting action.

Eight anionic, eight cationic, 18 nonionic and six other amphoteric or unidentified surfactants were evaluated for their ability to wet coal by measuring the contact angle between the coal surface and the aqueous solution of each of these surfactants. A further consideration for the surfactants was their compatibility with water since the foamable compositions of the invention are water-based compositions. Three of the surfactants among the forty candidates were eliminated on the basis that they were soluble in water only at higher temperatures than room temperatures (25°C.). Based upon their low contact angles (10° or less) with the coal surface, fifteen surfactants were selected for further evaluation. Among the 15 surfactants selected for further evaluation were anionic surfactants, a cationic surfactant, a number of nonionic surfactants and a few of the amphoteric surfactants. Since nonionic detergents function independently of water hardness and pH, a nonionic surfactant would be the more desirable candidate as a coal dust wetting agent.

The wettability of coal with surfactants was determined by the measurement of the contact angle between a drop of aqueous surfactant solution on the coal surface. To measure the contact angle an instrument was designed and fabricated which consisted of a goniometer eyepiece attached to a telescope. Coal slabs, each with the dimensions of 1¼ × ¾ × 7/16 in. were cut from a large lump of bituminous coal from West Virginia and polished. The slab was placed horizontally between the telescope and the diffused light source.

A drop of surfactant solution was put on the coal slab surface by means of a syringe. A fresh area of coal surface was used for each test. The contact angle ($\theta$) defines the wettability. When the surfactant solution wets the coal completely and spreads freely over the surface, the contact angle is equal to or approaches zero ($\theta=0$). Thus the tendency for the surfactant solution to spread over the surface of the coal increases as $\theta$ decreases. The contact angle is a useful inverse measure of spreadability or wettability.

The contact angle was measured three minutes after the drop was placed on the coal. Most of the surfactants were mixed with water in three surfactant-water proportions: 1/900, 1/1200, and 1/1500. All of the fifteen surfactants selected from the forty had contact angles at concentrations of 1/900 of 10 or less degrees. These 15 surfactants were:

Anionic Surfactants

DDBSA 99-B made by Monsanto Company
DDBSA 99-UB made by Monsanto Company
Monawet MO-70 made by Mona Industries, Inc.
Santomerse ME-B Slurry made by Monsanto Company Cationic Surfactants Emcol E-12 made by Witco Chemical Company Nonionic Surfactants Kyro EOB made by Procter and Gamble
Poly-Tergent J-300 made by Olin Mathieson Chemical Corp.
Renex 30 made by Atlas Chemical Industries
Sterox AJ made by Monsanto Company
Tergitol TMN made by Union Carbide Corp.
Tetronic 1302 made by Wyandotte Chemicals Corp.
Triton X-100 made by Rohm & Haas Co.

Amphoteric and Unidentified Surfactants

Amidex C-5 made by Stepan Chemical Company
R35 15-11 an experimental surfactant made by Mona Industries
R35 15-40 an experimental surfactant made by Mona Industries Foam generation tests were next carried out for the evaluation of water-soluble polymers. A foam consists of a mass of gas bubbles dispersed in a solid or liquid matrix, a liquid matrix in this instance. Low-density (high-expansion foams are dispersions of relatively large volumes of gas in relatively small volumes of liquid. For our use water-based and limited-stability foams were desired.

As a starting point, a general foam formulation was set up for this work. Generally a foam for dust suppression should be made of the following four ingredients:
Water — the basic material.
Surfactant — the coal dust wetting agent.
Foaming Agent — the foamer.
Polymer — the reinforcement material.
The first three components are essential to foaming and wetting the dust. The polymer addition is to provide "toughness or body" to the foam, and to keep the dust particles encapsulated (inhibit reaerosolization) after the foam has drained to the floor of the mine and collapsed.

Water constitutes the main body of the foam. The surfactants which were used in the foam formulations for the initial screening evaluation of the water-soluble polymers was Hi-Ex 15AE plus 35, made by the Walter Kidde Company. This surfactant has a small contact angle and thus is a good wetting agent. Past experience also showed it to be a very good foaming agent.

The foam for our laboratory tests was generated in a system consisting of the following three components:
1. the foam solution reservoir,
2. the spray nozzle and screen, and
3. the air blower.
The foam solution is pushed by compressed air or nitrogen (in actual mine use, a pump would most likely be used) and sprayed through the nozzle onto the screen. It is blown into a foam by the air from the blower.

The foam solution flow rate and the air blower speed can be adjusted during the spraying of the foam. Generally a "wet" foam will be produced at high foam solution flow rate. A high-expansion foam is usually formed at low foam solution flow rate and high air blower speed. By expansion factor is meant the ratio of the volume of foam produced to the volume of solution sprayed.

A Foamjet nozzle (Spraying Systems, Inc. No. 11259-U Type ¼ TT) with an orifice disc D-1.5 was modified by cutting a slot at 90° to the slot in the original nozzle and used in the generation of the foam. The device could spray foam solution at different rates up to 360 ml./min. Foams with expansion factors ranging from 50X to 400X could be made. The high-expansion foams are most desirable and high-expansion foam is defined as one having an expansion factor of over 50X.

To further economize the foam formulations, a study was made on the possibility of using a surfactant that would also function as a foaming agent. Even though Hi-Ex was also shown to be a good wetting agent for coal, its cost kept it from being considered as a combined surfactant/wetting agent candidate.

To evaluate the promising coal-wetting agent surfactants as foaming agents, 1.5 parts of each of them were mixed with 100 parts of water and sprayed into foam. These surfactants were Amidex C-5, Kyro EOB, Poly-Tergent J-300, Sterox AJ and Tergitol TMN. All of these surfactants as foamers gave high-expansion foams having expansion factors between 200 and 300X with Tergitol TMN even at 0.5 parts per 100 parts of water giving a foam expansion factor 285X. Of these five Amidex C-5 had the lowest expansion factor. As compared to Kyro EOB, Poly-Tergent J-300 had greater wettability on coal and Sterox AJ could produce foam with higher expansion factor. Thus Poly-Tergent J-300, Serox AJ and Tergitol TMN were selected as promising surfactants to be used as combined wetting and foam agents in further testing.

Tergitol TMN was shown to be the most promising surfactant/foaming agent. High-expansion foam could be produced even when 0.5 parts of Tergitol TMN was used with 100 parts of water. Tergitol TMN is a trimethyl nonyl polyethylene glycol ether. It contains 90% by weight of active ingredient. Its specific gravity at 20/20°C. is 1.024 (8.3 lb./gal.).

The interpolymers usable in the compositions and process of the invention are described in U.S. Pat. No. 3,563,795 and methods of making intermediate suitable for making some of the species, namely, vinyl acetate/maleic anhydride copolymers, are described in U.S. Pat. Nos. 2,470,909, 2,476,474 and 2,562,852. The interpolymers are preferably compatible with the surfactant in the compositions of the invention so concentrated foamable compositions can be stored for a time prior to use. One of the most promising of the surfactants, Tergitol (TMN), was made up in both dilute and concentrated solutions with vinyl acetate/maleic anhydride copolymer ester and was found to be compatible. Dilute aqueous solutions containing 0.5% by weight Lytron 897 or Lytron 898 and 0.5% Tergitol (TMN) were prepared and found to be stable. The viscosities of these dilute solutions determined at 23°C. were as follows:
Lytron 897 solution 3.5 c.p.s.
Lytron 898 solution 3.0 c.p.s.
These Lytrons are vinyl acetate/maleic anhydride copolymer esters marketed by Monsanto Company, and they are two different grades of copolymers of different degrees of esterification and molecular weight. Lytron 897 is in the form of a fine, off-white powder, bulk-density of 46 lbs./cu. ft., acid number - 440; soluble in water, 2B alcohol and acetone; insoluble in ethyl acetate, toluene and hexane; having a pH 1% solution of 2. Lytron 898 is slightly lower molecular weight than Lytron 897, is in the form of a coarse crushed product, bulk-density of 55 lbs./cu. ft., acid number — 580, and has similar solution pH and solubility and insolubility characteristics as Lytron 897.

More concentrated polymer solutions were also prepared since for coal mine application, it is desirable to prepare the foamable solution in concentrated form that will be diluted prior to spraying in order to reduce transportation expenses. Also, the polymer concentrates should not be too viscous so they can be pumped easily during the dilution process. Thus, concentrate preparations and viscosities were investigated as follows:

Polymer/Water System

Aqueous solutions of 10% Lytron 897 or 10% Lytron 898 were prepared and their vicosities measured at 21°C. with the following results:
Lytron 897 solution 760 c.p.s.
Lytron 898 solution 120 c.p.s.
Aqueous solutions of Lytron 898 were also prepared at 35% and 33% concentrations. Both were very viscous and became even more viscous on standing.

Polymer/Tergitol TMN/Water System

These solutions were of the following compositions:

| Water | Polymer | Tergitol (TMN) |
|---|---|---|
| 35 ml. | Lytron 897 - 15 g. | 30 ml. |
| 55 ml. | Lytron 898 - 15 g. | 30 ml. |

The Lytron 897 concentrate was homogeneous, clear, yellow-colored, and it was very viscous, like a soft jelly. The Lytron 898 solution was light brown in color, homogeneous but translucent, and its viscosity was 43,000 c.p.s. at 24°C.

Foam expansion factor was determined by the following procedure. An open-top cardboard box was prepared. Its weight (in grams) and volume (in milliliter) were determined. Foam was sprayed into the box until it was filled. Normally, it took 10 to 20 seconds to fill a box with a volume of 140,000 ml. During such a short period of time, no drainage came out of the foam in the box. The weight (in grams) of the foam-filled box was checked again. The foam expansion factor was calculated by dividing the volume of the box by the weight of foam.

These two dilute solutions, i.e. 0.5% Lytron and 0.5% Tergitol, were evaluated in the following respects.

Foaming Performance

These solutions were sprayed separately into foam and the foam expansion factors were calculated as follows:
Lytron 897 foam 66:1
Lytron 898 foam 194:1

Coal Dust Wetting Effect

About 20 ml. of each of these two dilute solutions were put separately in two 50 ml. beakers. A small amount (about 0.5 grams) of coal dust was sprinkled onto the surface of each of the solutions. The following results were observed.

| Lytron 897 solution | — | Coal dust was wetted down in 5 seconds. |
| Lytron 898 solution | — | Coal dust was wetted down in 3 seconds. |

Coal Dust Cementing Effect

In each of two 50 ml. beakers, coal dust (2 grams) was mixed separately with each (1.6 ml.) of the two solutions and each mixture was kneaded into a mass attached to one side of the beaker wall. After 18 days, when the beaker wall was tapped with a spatula the coal dust remained stuck together.

As a result of the above research, a promising foam formulation was developed. It wetted down coal dust, bound the coal dust and produced foams of high expansion factors. This foam had limited stability and was inexpensive. The generalized formulation is as follows:
Water
Polymer (Lytron 898)
Wetting Agent/Foaming Agent (Tergitol - TMN)

The dilute concentration of Lytron 898 for foaming can be varied from about 0.1 to 10%, but is preferably in the range of about 0.2 to 2.0%, being present in at least sufficient amount to bind the coal particles and give body to the foam. To every 100 parts by volume of polymer solution, 0.5 parts of Tergitol TMN is added to furnish desirable foamability as well as coal dust wettability, and obviously this amount of Tergitol TMN can be varied to a degree on either side of the specified amount.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. An aqueous foamable composition usable to suppress coal dust comprising water, a detergent wetting agent to wet the coal and promote foaming, and a sufficient amount to give body to the foam and to bind the coal dust particles to inhibit reaerosolization of an interpolymer soluble in water at 25°C. of:
  a. a polymerizable vinyl ester and
  b. a partial ester compound interpolymerizable therewith selected from the group consisting of partial esters of ethylenically unsaturated aliphatic dicarboxylic acids and anhydrides containing fron 4–8 carbon atoms and mixtures thereof; said dicarboxylic acid or anhydride having up to half of its acidic hydrogen atoms replaced by lower alkyl groups of 1–8 carbon atoms and mixtures thereof.

2. A composition of claim 1 wherein said wetting agent is a water-soluble nonionic detergent.

3. A composition of claim 2 wherein said interpolymer is a vinyl acetate/maleic anhydride copolymer ester.

4. A composition of claim 3 wherein said detergent is a trimethyl nonyl polyethylene glycol ether.

5. A composition of claim 3 wherein said copolymer ester has an acid number in the range of about 400 to 600.

6. A composition of claim 4 wherein said glycol ester has a specific gravity at 20/20°C. of about 1.02.

7. A process for suppressing coal dust comprising applying to said coal dust a sufficient amount ot substantially suppress said dust of a foam made from an aqueous foamable composition usable to suppress coal dust comprising water, a detergent wetting agent to wet the coal and promote foaming, and a sufficient amount to give body to the foam and to bind the coal dust particles to inhibit reaerosolization of an interpolymer soluble in water at 25°C. of:

a. a polymerizable vinyl ester and b. a partial ester compound interpolymerizable therewith selected from the group consisting of partial esters of ethylenically unsaturated aliphatic dicarboxylic acid and anhydrides containing from 4–8 carbon atoms and mixtures thereof; said dicarboxylic acid or anhydride having up to half of its acidic hydrogen atoms replaced by lower alkyl groups of 1–8 carbon atoms and mixtures thereof.

8. A process of claim 7 wherein said wetting agent is a water-soluble nonionic detergent.

9. A process of claim 8 wherein said interpolymer is a vinyl acetate/maleic anhydride copolymer ester.

10. A process of claim 9 wherein said detergent is a trimethyl nonyl polyethylene glycol ether.

11. A process of claim 10 wherein said copolymer ester has an acid number in the range of about 400 to 600.

12. A process of claim 10 wherein said glycol ester has a specific gravity at 20/20°C. of about 1.02.

13. A process of claim 7 wherein said foam is applied to coal dust as it is being formed by a coal cutting machine.

* * * * *